United States Patent [19]

Tomii et al.

[11] 4,163,250
[45] Jul. 31, 1979

[54] INDEX TUBE COLOR TELEVISION SYSTEM WITH DEFLECTION RATE ERROR CORRECTION

[75] Inventors: Kaoru Tomii; Yoshihiro Hosokawa, both of Kawasaki, Japan

[73] Assignee: Matsushita Electric Industrial Co., Ltd., Japan

[21] Appl. No.: 861,428

[22] Filed: Dec. 16, 1977

[30] Foreign Application Priority Data

Dec. 17, 1976 [JP] Japan .................................. 51/152520

[51] Int. Cl.² .......................... H04N 9/07; H04N 9/24
[52] U.S. Cl. ......................................... 358/45; 358/46; 358/67
[58] Field of Search ........................ 358/45, 46, 67, 68, 358/69, 70

[56] References Cited

U.S. PATENT DOCUMENTS 3,732,359  5/1973  Chen .................................... 358/68

Primary Examiner—Robert L. Richardson
Attorney, Agent, or Firm—Lowe, King, Price & Becker

[57] ABSTRACT

In a color television system including a plurality of index signal generating elements located outside an image area of an electron-impinged target surface in registry with successive color stripes located within the image area, the index signal is generated at the start of each raster scan and pulse repetition rate demodulated into a voltage signal representing the instantaneous speed of the electron beam scanning across the target surface. The voltage signal is stored in a charge transfer device for an interval of a subsequent raster and retrieved at the start of each horizontal trace for purposes of compensating for nonlinearities in the performance of beam deflection systems.

7 Claims, 6 Drawing Figures

INDEX TUBE COLOR TELEVISION SYSTEM WITH DEFLECTION RATE ERROR CORRECTION

FIELD OF THE INVENTION

The present invention relates generally to color television systems, and more particularly to a color television system incorporating an index cathode-ray device. Specifically, the invention relates to an improvement to the index tube color television systems disclosed in U.S. Pat. No. 3,939,486 assigned to the assignee of the present invention.

DESCRIPTION OF THE PRIOR ART

The above-mentioned United States patent discloses index cathode-ray image and display devices which include a plurality of electron impingement sensors arranged in a horizontal row outside an image area within which repetitive groups of vertically oriented color stripes are located in registry with the sensors. An index signal is generated in response to electron scansion across the sensors at the start of and along each raster scan. In the prior art systems, the index signal is stored within a storage device for the interval of the successive field or frame and retrieved at intervals in response to each subsequent horizontal trace for beam orientation purposes. However, the storage device must be provided with many more storage memory cells than there are index sensors and therefore it tends to become bulky and expensive.

SUMMARY OF THE INVENTION

It is a principal object of the invention to provide an index color television system in which the index signal generated at the start of each raster scan is frequency pulse repetition rate demodulated to convert it into a voltage signal of which the instantaneous amplitudes represent the instantaneous pulse repetition rates of the index signal and hence the instantaneous speeds of the electron beam scanning across the target face.

It is another object of the invention is to provide an inexpensive storage device which is able to nondestructively read out the stored index signal during the interval of a raster scan.

In accordance with the invention, the index signal is frequency demodulated by a conventional frequency demodulator circuit so that its output voltage is indicative of the instantaneous frequency pulse repetition rate of the index signal, which signal is applied to a storage device. The storage device comprises a first charge transfer device which stores the instantaneous values of the input signal in a series of memory cells, a second charge transfer device and a charge regeneration source which regenerates charges corresponding to the stored instantaneous values of the input signal and transfers the regenerated charges to the second charge transfer device. Since the input signal is in analog form, the number of memory cells required is far less than that required in the prior art systems. The information stored in the second charge transfer device will be read out to compensate for nonlinearities in the performance of beam deflection systems.

BRIEF DESCRIPTION OF THE DRAWINGS

The invention will be further described with reference to the accompanying drawings, in which.

DETAILED DESCRIPTION

Figure 1:
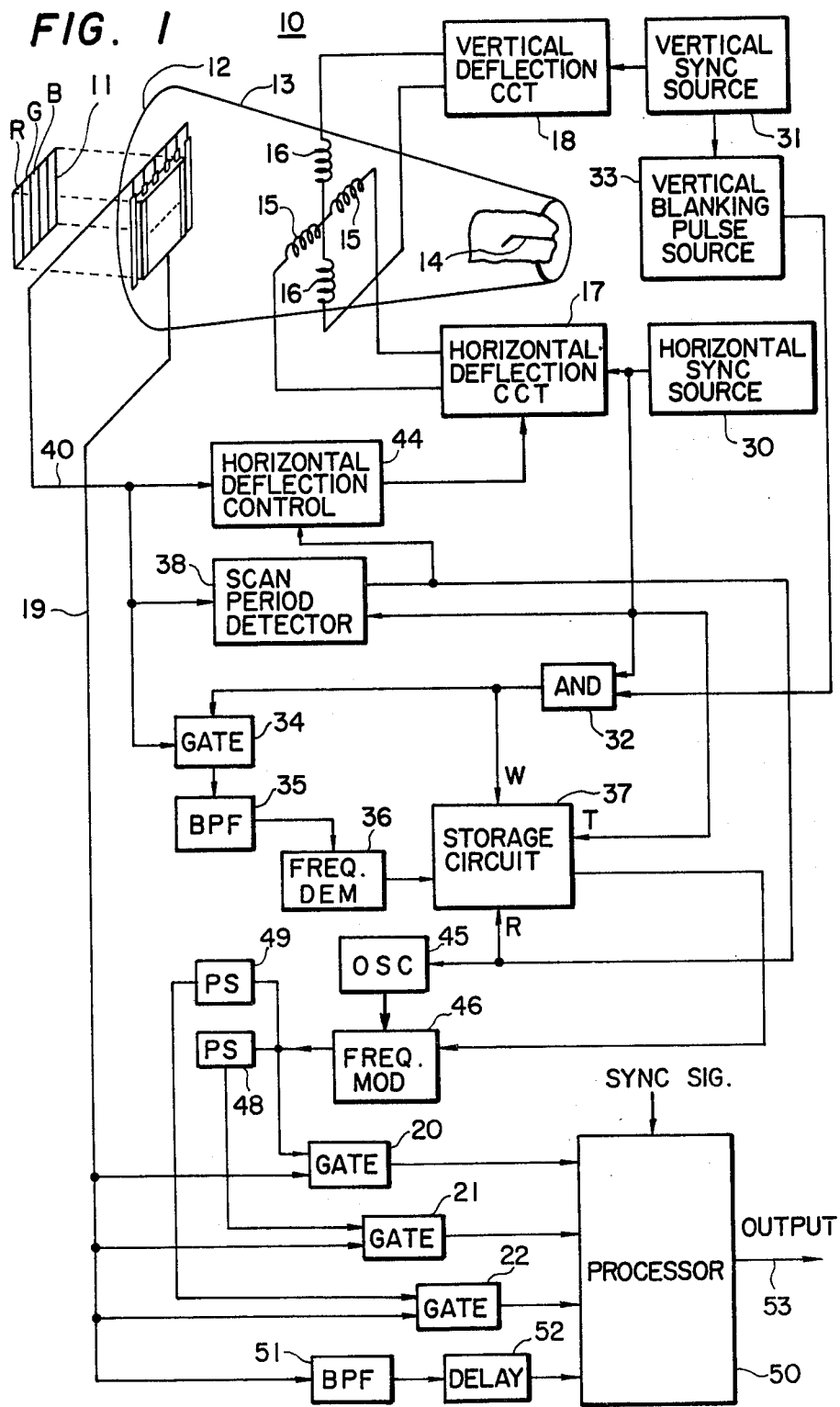
FIG. 1 is a schematic block diagram of an embodiment of the invention.

The color television transmission system represented in FIG. 1 includes camera 10. The image is focused by conventional optical means, not shown, through striped color filter 11 onto target 12 of an image tube 13. Tube 13 may be any type of image scanning device, such as a vidicon, Plumbicon and image orthicon tube. The tube produces a video output signal indicative of the intensity of light at successively scanned points on target 12. For purposes of illustration, it can be assumed that an electron beam generated by source 14 is deflected in a conventional manner so as to scan the target in a predetermined pattern or scansion. The deflection may be by electromagnetic, electrostatic or other means although the invention is in no way limited to any specific deflection technique. For a rectilinear scan independent horizontal and vertical deflection of the beam is normally provided. Coils 15 are representative of an electron magnetic device for producing horizontal deflection in response to a waveform produced by horizontal deflection circuit 17 with its associated horizontal sync source 30. Coils 16 provide vertical deflection in response to a waveform generated by vertical deflection circuit 18 with its associated vertical sync source 31.

The video signal is shown as appearing on lead 19 which is coupled to the photoconductive target 12. The video signal produced by tube 13 is applied to sampling gates 20, 21 and 22 to derive respective primary color signal components.

Figure 2:
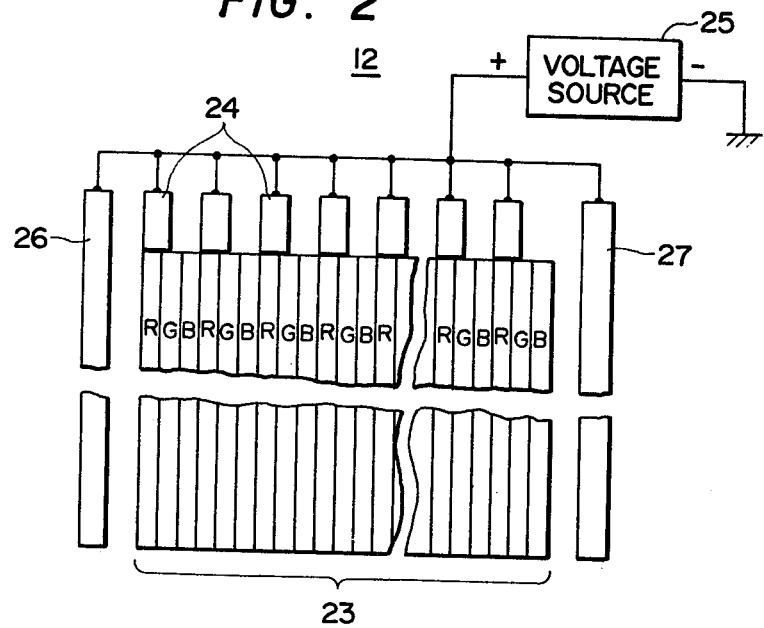
FIG. 2 is a schematic plan view of the target of an image tube of FIG. 1.

Although many types of striped tubes can be employed, the preferred arrangement utilizes vertically oriented light passing filter stripes arranged in triads or primary colors, such as red, green and blue, designated R, G and B, respectively. As clearly shown in FIG. 2, repetitive groups of such light passing filter stripes are horizontally successively arranged on the target face to form an image area 23 on which the image is focused. On the upper side of the target 12 adjacent to but outside of the image area 23 is located a plurality of electron impingement sensors 24. The sensors 24 may be formed on any electron sensitive material such as photoconductive stripes or metal strips biased at a positive potential. In this illustration, the sensors 24 are shown as comprising metal strips which are electrically connected to a source of high tension potential 25 to attract impinging electrons and each sensor 24 is positioned to associate with each triad group of the color strips. On the right and left sides of the target 12 adjacent to but outside of the image area 23 are located elongated electron impingement sensors 26 and 27, respectively. The sensor 26 is positioned to detect the impingement of electron beam at the start of each horizontal trace. Similarly, the sensor 27 is positioned to detect the impingement of electron beam at the end of each horizontal trace. The right and left hand sensors 26, 27 extend to form part of the upper side sensors 24 and are connected to the same voltage source 25. The electron beam from source 14 will be caused to scan across the sensors 24, 26 and 27 between successive raster scan or vertical blanking interval to generate a series of index pulses at a frequency pulse repetition rate proportional to the instantaneous scanning speed of the electron beam to compensate for any nonlinearity which may be present in the horizontal deflection circuit 17. The index signal is shown as appearing on lead 40.

Referring again to FIG. 1, an AND gate 32 is shown connected to horizontal sync source 30 and to vertical blanking pulse source 33 associated with the vertical sync source 31 to activate gate 34 to pass the index signal provided by the sensors 24, 26 and 27 to a bandpass filter 35. The bandpass filter or amplifier 35 is tuned to the fundamental frequency of the index signal.

If the line scan voltage developed in the horizontal deflection circuit 17 is linear as a function of time, the speed of the electron beam traversing the target 12 is uniform and the pulses of index signal appearing at conductor 40 are uniformly spaced apart. If, however, there is nonuniformity in the line scan voltage and therefore in the electron beam scan speed, the interval between successive index pulses is not constant.

In order to detect the presence of nonlinearity in line scanning, a frequency demodulator (pulse repetition rate-to-voltage converter) 36 is provided to convert the pulse repetition rate of the index signal derived from bandpass filter 35 into a voltage signal which is an analog representation of the nonlinearity. A storage circuit 37 is provided to store the output signal of the converter 36 for the interval of a raster scan. If the system employs interlaced scanning, the storage period corresponds to a field interval storage of the demodulated signal.

Figure 4:
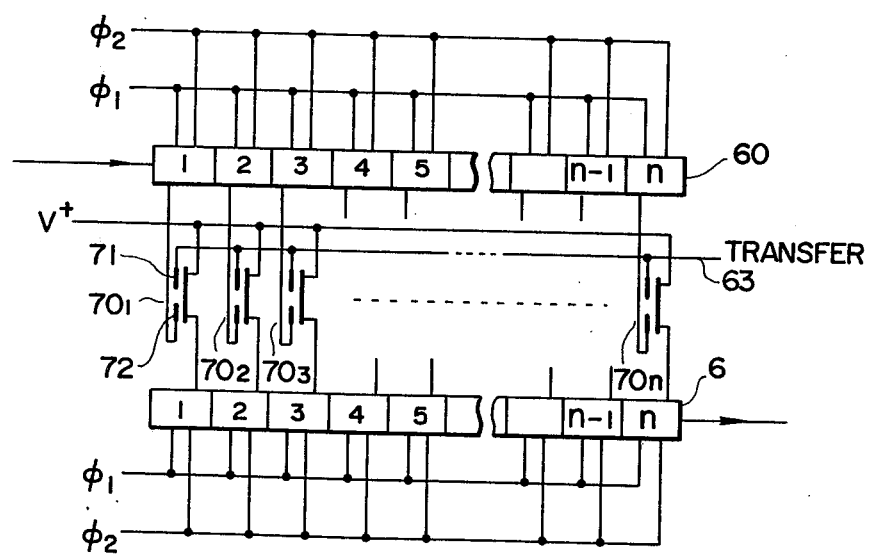
FIG. 4 is a detail of the storage device of FIG. 3.
Figure 3:
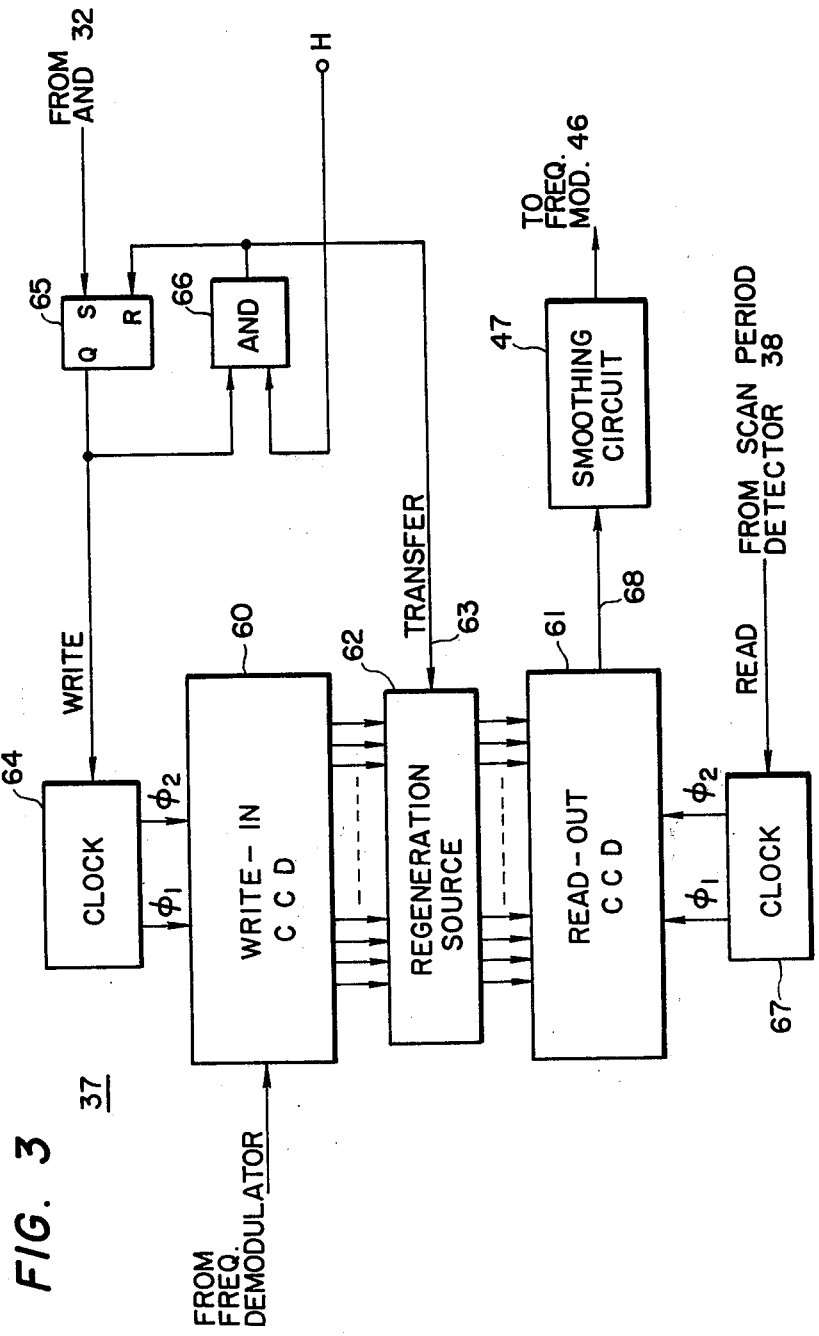
FIG. 3 is a schematic diagram of a storage device of FIG. 1.

A preferred embodiment of the storage circuit 37 is illustrated in FIGS. 3 and 4. As shown in FIG. 3, the storage circuit 37 includes a pair of charge coupled devices (CCDs) 60 and 61 and a charge regeneration source 62 interconnected between the two CCDs regenerate charges stored in CCD 60 and transfer them to CCD 61 in response to a signal at transfer input connection 63. CCD 60 is used for writing the demodulated pulse repetition rate-to-voltage converted signal into a series of its constituent memory cells in response to clock pulses supplied from source 64. Clock source 64 is in turn connected to the output of a flip-flop 65 which energizes source 64 at raster scan intervals in response to an output from the AND gate 32. An AND gate 66 is shown connected to the flip-flop 65 which enables gate 66 to pass horizontal sync pulses to the regeneration source 63. A clock source 67 is provided to clock out the transferred information in read-out CCD 61 to its output connection 68 in response to the presence of a signal from the AND gate 32.

Writing operation is accomplished by two phase clock signals $\phi_1$ and $\phi_2$ supplied to each memory cell of the write-in CCD to clock into the demodulated input signal from the leftmost position to the rightmost position. The instantaneous values of the index signal provided by the sensors during vertical blanking interval are now stored in the CCD 60. Nondestructive reading of the stored information is carried out by regenerating the corresponding charges in the read-out CCD 61 by means of regeneration source 62 which comprises a plurality of field-effect transistors $70_1, 70_2, 70_3 \ldots 70_n$. Each field-effect transistor has its source connected to a common positive voltage supply V+ and its drain connected to a respective memory cell of the read-out CCD as illustrated in FIG. 4. The first control gate 71 of each FET is connected to the transfer terminal connection 63 to control the ON-OFF states of all FETs. A logic "1" signal appearing on lead 63 will turn on all FETs simultaneously to regenerate charges on the corresponding memory cells in CCD 61. Each of the regenerated charges is modified by the potential applied to the second control gate 72 of each FET from the corresponding memory cell in the write-in CCD 60. Since the field-effect transistor is a voltage-controlled device, there is substantially no energy consumption involved in regenerating the charges so that the information can be transferred as many times as there are scan lines in a field or frame raster scan. The transferred information can now be clocked out by clock signals $\phi_1$ and $\phi_2$ from clock source 67 to its output connection 68.

Figure 5:
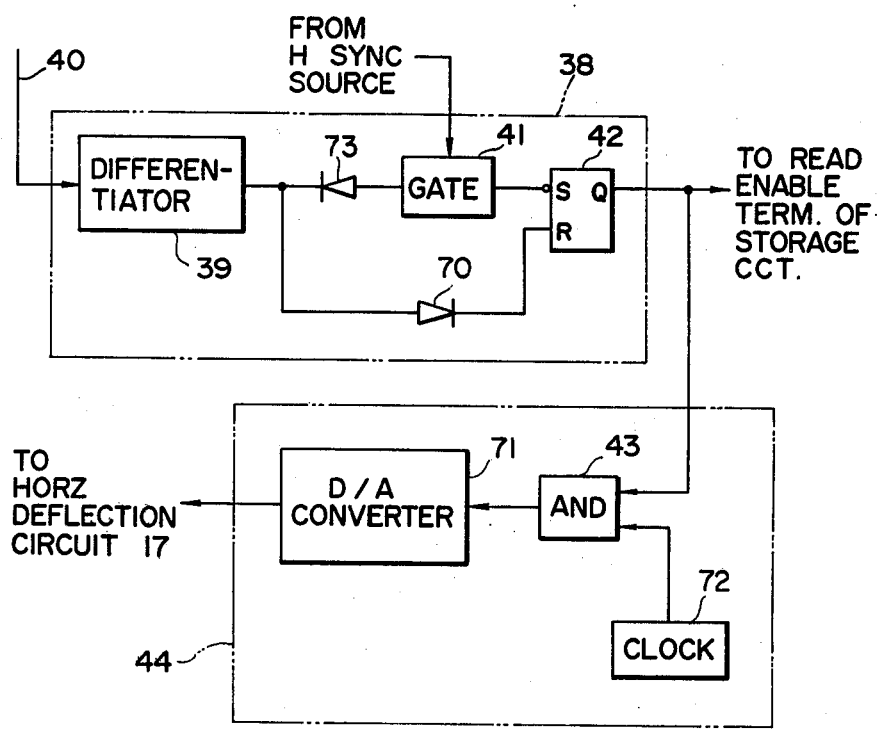
FIG. 5 shows details of a scan period detector and horizontal deflection control circuit of FIG. 1.
Figure 6:
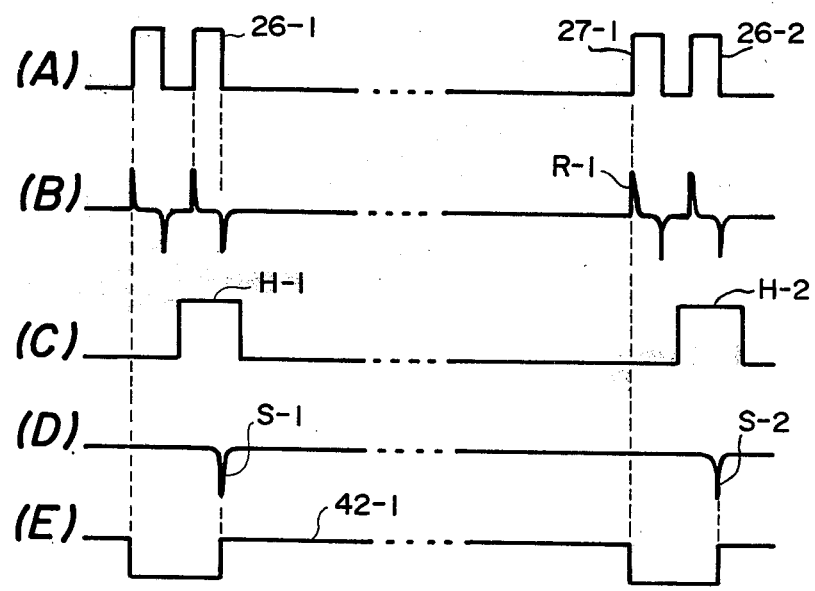
FIG. 6 is a waveform diagram useful for describing the operation of the scan period detector of FIG. 5.

Because of nonlinearities inherent in the performance of the deflection systems, the time it takes the electron beam to traverse the target face in each horizontal trace may differ from one line path to another. The effect of the scan period detector 38 is to precisely detect the beam scanning time for each line scan to provide correct timing action for the reading operation as mentioned above, as well as for the purpose of nonlinearity compensation. In FIG. 5, the detector 38 is shown as comprising a differentiating circuit 39 connected to the lead 40 for detecting the leading and trailing edges of the timing index signals provided by the sensors 26 and 27 during each horizontal trace. The negative-going differentiated pulse goes through diode 73 and gate 41, when enabled by a horizontal sync, to the inverted set input of a flip-flop 42 providing a high Q output therefrom to enable an AND gate 43 of a horizontal deflection control circuit 44. The flip-flop 42 remains in the set condition until it is reset by the positive-going pulse through diode 45. A circuit arranged in this configuration just described produces a rectangular pulse whose leading edge corresponds to the trailing edge of the index pulse provided by sensor 26 and whose trailing edge corresponds to the leading edge of the index pulse provided by sensor 27, as clearly illustrated in FIGS. 6A to 6E. Pulses 26-1 and 27-1 are provided respectively by sensors 26 and 27 at the start and end of a given horizontal scan (FIG. 6A). Differentiated pulses are shown in FIG. 6B of which the negative pulses are allowed to pass through gate 41 in response to horizontal sync pulses H-1 and H-2 (FIG. 6C) providing negative set pulses S-1 and S-2 (FIG. 6D). The resetting signal is a positive differentiated pulse R-1 (FIG. 6B) and the rectangular pulse 42-1 is as shown in FIG. 6E. Thus, the pulse 42-1 is a true indication of the length of time that it takes an electron beam to traverse the target face 12. Therefore, the start and end of the reading operation is correctly timed with the start and end of each horizontal trace.

During the time the AND gate 43 of horizontal deflection control 44 is enabled, clock pulses are supplied to a digital-analog converter 71 from source 72 to convert the number of pulses received into a corresponding voltage signal which will energize the horizontal deflection circuit to modify the horizontal deflection waveform generated by circuit 17 so that the horizontal deflection angle is adjusted to cause the scanning beam to start at the position of the sensor 26 to end at the position of the sensor 27 during subsequent horizontal scan.

On the other hand, the output from the storage circuit 37 is used to generate phase-shifted sampling pulses to provide a dot-sequential primary color signal. An oscillator 45 is shown connected to the output of scan period detector 38 which energizes oscillator 45 during the detected scan period to permit it to run at a frequency synchronized with the triplet frequency of the filter stripes that occurs as a result of the scanning of the beam across the target 12. The oscillator output is applied to a frequency modulator or voltage-to-frequency converter 46 to which the output from the read-out CCD 61 is also applied through a smoothing circuit 47 (FIG. 3) where the pulsed stream of the input signal is converted into a voltage signal. This voltage signal is used to modulate the frequency of the oscillator 45. Thus, the output of frequency modulator 46 is identical to the index signal obtained on lead 40 during each vertical blanking interval and regenerated during each horizontal scan interval.

Since the index pulses appear at positions which vary as a function of the horizontal speed of the electron beam, the index pulses derived from conductor 40 and hence the index pulses provided by the converter 46 are not uniformly spaced apart from each other if nonlinearity exists in the line scan sweep, especially early in each line scan, so that the frequency (pulse repetition rate) of the index signal varies from instant to instant. Since the signal stored in the storage circuit 37 is an analog rather than digitally encoded or otherwise converted representation of the nonuniformity of the line scan speed, the storage circuit 37 need not have a large storage capacity which would otherwise be required if the index signal is directly stored therein.

The regenerated index signal is applied to three separate channels including 0°, 120° and 240° phase shifting circuits. The zero phase shift signal is directly applied to the control terminal of gate 20, while the 120° and 240° phase shifted signals are applied through respective phase shifters 48 and 49 to the control terminals of gates 21 and 22, respectively, to accomplish the sampling operation. The sampled signals are fed into a processor 50 to form a dot-sequential signal. A bandpass filter 51 in a series circuit with a delay circuit 52 are connected to lead 19. The bandpass filter is tuned to select the luminance component of the video output. The luminance signal is delayed so that it is in phase with the sampled signals. The dot-sequential chrominance signal and the luminance signal are combined in the processor along with vertical and horizontal synchronization signals to produce a composite color television output signal on lead 53 for transmission.

Although foregoing description is concerned with a color television transmission system, the gist of the present invention can also be applied to color television receiving systems.

What is claimed is:

1. A color television system, comprising:
   a surface having an image area on which an image is formed;
   periodically repetitive groups of vertically oriented color stripes located on said image area;
   a plurality of electron impingement sensors located in a single horizontal row on said surface adjacent to but outside said image area and positionally associated with said color stripes;
   a vertically oriented electron impingement sensing stripe located on said surface adjacent to but outside said image area;
   means for producing an electron beam;
   deflection means for causing said electron beam to scan said surface horizontally along a plurality of line paths to form successive rasters on said surface, thereby resulting in the generation of a first index signal produced in response to the impingement of said beam upon said plurality of sensors at the start of the formation of each raster, and a second index signal produced in response to the impingement of said beam upon said sensing stripe at the start of each horizontal line scan;
   pulse repetition rate-to-voltage conversion means for converting the first index signal into a voltage signal representative of the instantaneous pulse repetition rate of the first index signal and thereby of the instantaneous sweep speed of the electron beam;
   storage means including a plurality of storage locations; and
   storage device control means for writing said voltage signal into said storage locations of said storage means at the start of each raster scan and retrieving the stored signal at intervals in response to said second index signal.

2. A color television system as claimed in claim 1, wherein said storage means comprises:
   first and second charge transfer devices;
   first clock means for driving said first charge transfer device to accept the pulse repetition rate-to-voltage converted first index signal at a predetermined clock rate in response to said storage device control means;
   charge regeneration means connected between said first and second charge transfer devices, said charge regeneration means including a plurality of voltage-controlled devices responsive to the charges stored in said first charge transfer device to regenerate corresponding charges in said second charge transfer device simultaneously in response to the start of each line scan; and
   second clock means for driving said second charge transfer device at said predetermined clock rate to retrieve the regenerated charges in response to said second index signal.

3. A color television system as claimed in claim 2, wherein each of said first and second charge transfer devices comprises a charge coupled device.

4. A color television system as claimed in claim 2, wherein each of said voltage-controlled devices comprises a field-effect transistor.

5. A color television system as claimed in claim 2, further comprising:
   a second vertically oriented electron impingement sensing stripe located on said surface adjacent to but outside said image area opposite to the first-mentioned sensing stripe to thereby generate a third index signal in response to the impingement of the electron beam thereupon at the end of each line scan;
   means for generating a first voltage signal in response to said second index signal and a second voltage signal in response to said third index signal to produce a pulse of which the duration is representative of the time required for the electron beam to traverse said image area at each line scan;
   said second clock means of said storage device being responsive to the presence of said time representative pulse to drive said second charge transfer device.

6. A color television system as claimed in claim 5, further comprising means for generating a voltage signal of which the magnitude is proportional to the length of said time representative pulse and means for controlling the horizontal deflection angle of said electron beam in accordance with said voltage signal.

7. A color television system as claimed in claim 1, further comprising:
- means for generating a video signal in response to the impingement of said electron beam upon said image area;
- an oscillator;
- frequency modulation means for modulating the frequency of the output of said oscillator in accordance with said retrieved, pulse repetition rate-to-voltage converted index signal;
- sampling means responsive to the output of said frequency modulation means for sampling said video signal to produce primary color signals on three separate channels, said primary color signal of each channel being electrically displaced in phase by 120° from the primary color signal of the other channels.

* * * * *